No. 645,126. Patented Mar. 13, 1900.
L. C. REED.
ELECTRIC METER.
(Application filed July 10, 1899.)
(No Model.)
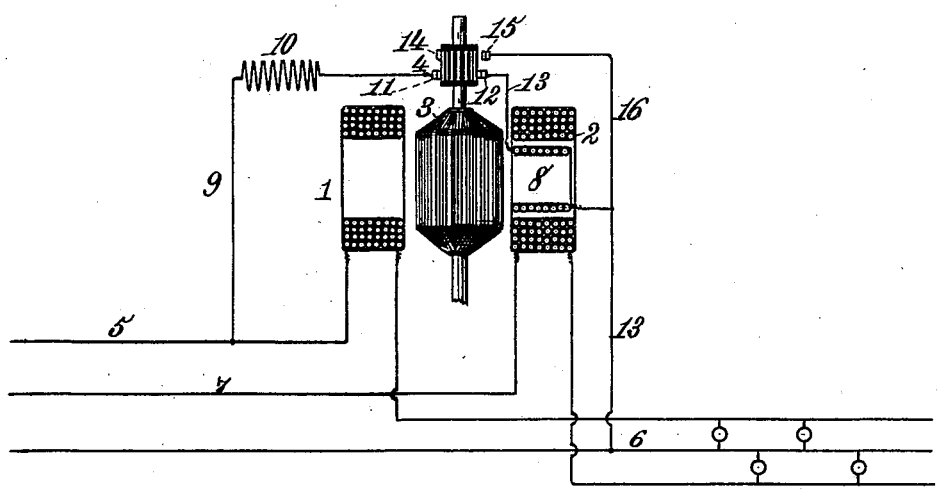
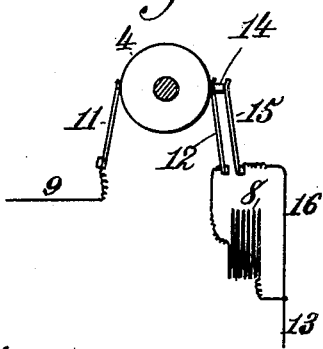
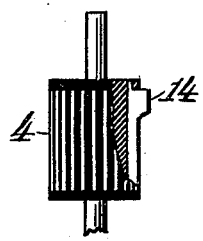
Witnesses,
Robert Everett,
H. B. Keefer
Inventor,
Lyman C. Reed,
By James L. Norris
Att'y

UNITED STATES PATENT OFFICE.

LYMAN C. REED, OF NEW ORLEANS, LOUISIANA.

ELECTRIC METER.

SPECIFICATION forming part of Letters Patent No. 645,126, dated March 13, 1900.

Application filed July 10, 1899. Serial No. 723,380. (No model.)

*To all whom it may concern:*

Be it known that I, LYMAN C. REED, a citizen of the United States, residing at New Orleans, in the parish of Orleans and State of Louisiana, have invented new and useful Improvements in Electric Meters, of which the following is a specification.

My invention relates to electric meters, the object of the same being to provide means whereby a correct measurement and registration of the current consumed may be obtained on small installations through all ranges of load.

In electric meters as constructed at present a starting-coil is employed, located within one of the fields of the meter and in a normally-closed circuit through a resistance of proper strength and a commutator, the same being provided to overcome friction of the moving parts. If this starting-coil, however, is made large enough to operate successfully on small loads, it has a tendency to cause a "creeping" of the armature, which not only renders the registration of the instrument inaccurate, but causes dissatisfaction with the consumer, who does not like to see the meter operating when no current is being consumed.

By my invention I provide means for normally short-circuiting the starting-coil, so that it may be made of sufficient strength for the meter to operate successfully on a small load, and whereby the creeping action of the instrument when no current is being consumed is effectually overcome.

The details of my invention will be set forth hereinafter, and the novel features thereof will be specifically defined in the claims.

In the drawings forming part of this specification, Figure 1 represents my invention in connection with a three-wire distribution system diagrammatically. Fig. 2 is a detail end view of the commutator, showing the relative positions of the main and auxiliary brushes thereon. Fig. 3 is a detail sectional elevation of the commutator.

The meter in connection with which my device is adapted to be used may be of any suitable form and construction. As illustrated the same comprises the positive field-coil 1, the negative field-coil 2, the armature 3, and the commutator 4, with which the service-wires 5 6 7 are connected in the manner shown.

The starting-coil 8, located within one of the fields, is in a normally-closed circuit, including the wire 9, resistance 10, commutator-brush 11, commutator 4, commutator-brush 12, and wire 13. As shown, this circuit leads from the positive service-leg 5 to the neutral leg 6. To one of the bars of the commutator 4 I secure a lug 14 of suitable conducting material, preferably silver, which projects outwardly from the periphery of the commutator. Coöperating with this lug is an auxiliary brush 15, which is located in line with the commutator-brush 12 and adjusted so that it engages the lug 14 once during each revolution of the commutator 4. This brush 15 constitutes one terminal of a shunt-circuit around the coil 8, through the wire 16, which is connected to the wire 13 on the side of the starting-coil 8 opposite the commutator 4. In this way the brush 15 serves to short-circuit the starting-coil 8, when contact takes place between said brush and the lug 14, at which time the brush 12 is in contact with the same bar of the commutator to which said lug is secured.

The operation of my device is as follows: If the action of the meter be stopped when the lug 14 is out of contact with the brush 12, the torque of the starting-coil may cause a creeping of the rotating parts until said lug and brush are in contact. When this takes place, the starting-coil is short-circuited through the wire 16, and further creeping action is impossible. By reason of the fact that the starting-coil is normally cut out when no current is passing through the meter the said coil may be made stronger and thereby increase the efficiency of the device on relatively-small loads and also overcome the friction between the lug 14 and brush 12, which takes place once during each rotation of the commutator.

The device above described may be applied to any meter now in use by simply soldering or otherwise attaching the lug 14 to one of the bars of the commutator, inserting the conducting-wire 16, and connecting the brush 15 to said wire, so that the brush will engage said lug. It will be understood, of course, that this device is especially intended for use upon meters of small capacity. With large installations where it is ordinarily impossible to secure accurate registrations upon small loads with a single meter I propose to employ two meters of different capacities in connection with a switching device for automatically throwing the larger meter into operation only when the current consumed is greater than the capacity of the small meter. With such arrangement my non-creeping device above described would be attached to the small meter. This coupling arrangement, however, forms the subject-matter of a separate application for patent filed concurrently herewith, Serial No. 723,381, and a detail description thereof need not be entered into herein.

Strengthening the starting-coil brings the efficiency curve of the meter to a straight load-line, making it register accurately on all loads from one light to maximum capacity.

It will be understood that the creeping action of the meter is increased by any vibrations, and often these vibrations are sufficient to cause a sparking of the brushes at the commutator, which causes a roughness of the commutator and brushes and consequent additional friction, adding to the inefficiency of the meter on light loads. The use of the device above described absolutely prevents the occurrence of this trouble.

Having now described my invention, what I claim as new, and desire to secure by Letters Patent, is—

1. In an electric meter, a commutator, a starting-coil in a normally-closed circuit through said commutator, a shunt-circuit around said starting-coil, and a contact-brush in said shunt-circuit, independent of said closed circuit, and adapted to engage said commutator as and for the purpose set forth.

2. In an electric meter, a starting-coil, a rotating commutator, a closed circuit through said coil and commutator, a shunt-circuit around said coil, a brush in the shunt-circuit, and a contact-piece on said commutator adapted to engage said brush, as and for the purpose set forth.

3. In an electric meter, a starting-coil, a rotating commutator, a closed circuit through said coil and commutator, a projecting lug on one of the bars of said commutator, a brush adapted to be engaged by said lug, and a shunt-circuit around said coil and including said brush, as and for the purpose set forth.

In testimony whereof I have hereunto set my hand in presence of two subscribing witnesses.

LYMAN C. REED.

Witnesses:
T. J. FORD,
HY. MÜLLER.